US012657667B2

(12) United States Patent　　　　(10) Patent No.:　US 12,657,667 B2
Chun et al.　　　　　　　　　　　　(45) Date of Patent:　　Jun. 16, 2026

(54) DIVERSITY-PRESERVED DOMAIN ADAPTATION USING TEXT-TO-IMAGE DIFFUSION FOR 3D GENERATIVE MODEL

(71) Applicant: SEOUL NATIONAL UNIVERSITY R&DB FOUNDATION, Seoul (KR)

(72) Inventors: Se Young Chun, Seoul (KR); Gwanghyun Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 327 days.

(21) Appl. No.: 18/534,243

(22) Filed: Dec. 8, 2023

(65) Prior Publication Data

US 2025/0061545 A1　　Feb. 20, 2025

(30) Foreign Application Priority Data

Aug. 17, 2023　(KR) ........................ 10-2023-0107395

(51) Int. Cl.
　　*G06T 5/60*　　　　　(2024.01)
　　*G06T 5/20*　　　　　(2006.01)
　　　　　　　　(Continued)
(52) U.S. Cl.
　　CPC ................. *G06T 5/60* (2024.01); *G06T 5/20* (2013.01); *G06T 5/50* (2013.01); *G06T 7/80* (2017.01);
　　　　　　　　(Continued)
(58) Field of Classification Search
　　None
　　See application file for complete search history.

(56) References Cited

U.S. PATENT DOCUMENTS 11,776,180 B2 * 10/2023 Xu ........................ G06V 10/454
　　　　　　　　　　　　　　　　　706/25
2022/0044352 A1　2/2022 Liao et al.
　　　　　　　　(Continued)

FOREIGN PATENT DOCUMENTS

CN　　　　116071452 A　*　5/2023　............. G06T 11/00
KR　　　10-2345520 B1　12/2021
KR　　10-2022-0129828 A　9/2022

OTHER PUBLICATIONS

C. Wang, M. Chai, M. He, D. Chen and J. Liao, "Cross-Domain and Disentangled Face Manipulation With 3D Guidance," in IEEE Transactions on Visualization and Computer Graphics, vol. 29, No. 4, pp. 2053-2066, Apr. 1, 2023. (Year: 2023).*

(Continued)

*Primary Examiner* — David Ometz
(74) *Attorney, Agent, or Firm* — Dinsmore & Shohl LLP; Yongsok Choi, Esq.

(57)　　　　　　ABSTRACT

An embodiment of the present disclosure provides a three-dimensional image generation method, which is performed by a server and is capable of domain adaptation, including generating N target images corresponding to a second domain by converting styles of previously collected N source images corresponding to a first domain according to instructions of an input text, selecting only a target image that satisfies a preset condition among the N target images, and generating multiple three-dimensional images corresponding to a specific domain through certain noise data and a preset camera pose parameter by training a three-dimensional generation model, which is previously built, by using the selected target image.

16 Claims, 13 Drawing Sheets

(51) Int. Cl.
    *G06T 5/50*         (2006.01)
    *G06T 7/80*         (2017.01)
    *G06T 19/20*        (2011.01)

(52) U.S. Cl.
    CPC .... *G06T 19/20* (2013.01); *G06T 2207/20081*
        (2013.01); *G06T 2207/20084* (2013.01); *G06T*
            *2207/30244* (2013.01); *G06T 2219/2024*
                           (2013.01)

(56)            References Cited

U.S. PATENT DOCUMENTS

2022/0076374 A1*   3/2022   Li  .......................... G06N 3/045
2024/0290054 A1*   8/2024   Yin  ........................ G06T 15/04

OTHER PUBLICATIONS

Gwanghyun Kim et al., DATID-3D: Diversity-Preserved Domain Adaptation Using Text-to-Image Diffusion for 3D Generative Model, arXiv, Nov. 29, 2022, pp. 1-21.

\* cited by examiner

<u>100</u>

130

Random latent $\mathcal{Z}$ →

Camera parameter $\mathcal{C}$ →

3D Generator $G_\theta$  10

Figure 6:
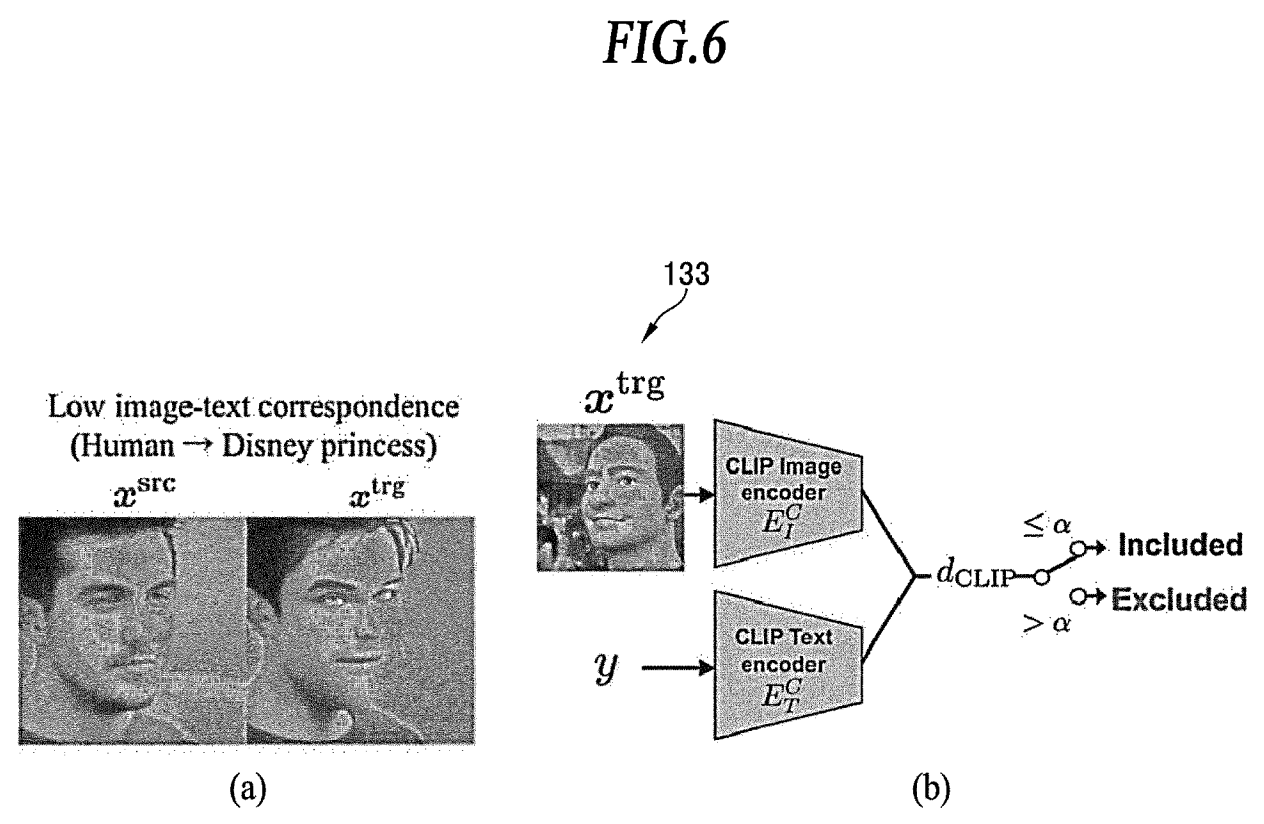

$x^{\mathrm{trg}}$

CLIP Image encoder $E_I^C$

CLIP Text encoder $E_T^C$ $y$ $d_{\mathrm{CLIP}}$ $\leq \alpha \rightarrow$ Included $> \alpha \rightarrow$ Excluded

133

(b)

Low image-text correspondence (Human → Disney princess)

$x^{\mathrm{src}}$    $x^{\mathrm{trg}}$ (a)

*FIG.13*

|  | KID ↓ | Text-Corr. ↑ | Realism ↑ | Diversity ↑ |
|---|---|---|---|---|
| StyleGAN-NADA* | 0.156 | 2.583 | 2.550 | 2.587 |
| HyperDomainNet* | 0.133 | 2.530 | 2.520 | 2.557 |
| Ours | 0.012 | 3.573 | 3.437 | 3.347 |

DIVERSITY-PRESERVED DOMAIN ADAPTATION USING TEXT-TO-IMAGE DIFFUSION FOR 3D GENERATIVE MODEL

CROSS-REFERENCE TO RELATED APPLICATION

This application is based on and claims priority under 35 U.S.C. § 119 to Korean Patent Application No. 10-2023-0107395, filed on Aug. 17, 2023, in the Korean Intellectual Property Office, the disclosure of which is incorporated by reference herein in its entirety.

BACKGROUND

The present disclosure relates to a three-dimensional (3D) image generation method and a 3D image generation device, and more particularly, discloses a domain adaptation technology using text-to-image diffusion for preserving the diversity of an image style and a 3D generation model based on the domain adaptation technology.

An era has arrived in which virtual images or characters are generated realistically by using a deep learning technology, rather than actually captured images to be introduced into various contents. For example, there is a technology for making virtual images similar to real images through an image generation model using of a neural network of a generative adversarial network (GAN) series.

Furthermore, recently, a 3D generation technology for generating multi-view virtual images by expanding a two-dimensional (2D) generation model is being researched. First, mesh-based, voxel-based, block-based, and fully implicit representation-based 3D generation models have been proposed, but the 3D generation models have low image quality, viewpoint inconsistency, inefficiency, and so on.

Technologies for solving the problems are being researched, some of which are implemented as models obtained by combining a 2D convolutional neural network (CNN) generator with neural rendering, and are being developed to synthesize high-quality images having multi-view consistency and detailed 3D shapes.

While the 3D generation models may sample 3D images of multiple viewpoints by using 2D images of a single viewpoint, training the images requires collection of massive images in various fields like 2D generation models. Also, unlike 2D, labeling of a camera pose that defines viewpoints for each collected image has to be performed in advance.

Due to unfavorable requirements of the learning process, a domain of images generated by the known 3D generation models is very limited in reality. For example, the domain is limited to only a few domains, such as simulation car sets or human or animal faces.

In addition, in a 2D image training field, an adaptation technology has been introduced which converts images into images of another domain by preserving the original content and changing only the style. For example, a situation occurs in which training data in various fields may be collected through adaptation as a virtual image even without actual photographing, such as converting an image of a human face into an image of a specific animal's face.

However, when attempting to generate 3D images of multiple domains by extending the adaptation technology to a 3D image model, images with poor consistency with the original image, desired intent, and between viewpoints are often generated. Also, since there are multiple styles in one domain, only 3D images expressed in similar styles are generated, which limits the quality of images in terms of diversity, making it difficult to be commercialized.

SUMMARY

The present disclosure provides a three-dimensional image generation device and a three-dimensional image generation method that generate three-dimensional images of various domains through text-to-image diffusion technique while original content is maintained, are adaptable even between domains having large gaps by training a three-dimensional generation model by using only filtered images which meet certain conditions, and preserve the diversity of three-dimensional images.

Technical objects to be achieved by the present embodiment are not limited to the technical object described above, and other technical objects may exist.

According to an aspect of the present disclosure, a three-dimensional image generation method, which is performed by a server and is capable of domain adaptation, includes generating N target images corresponding to a second domain by converting styles of previously collected N source images corresponding to a first domain according to instructions of an input text, selecting only a target image that satisfies a preset condition among the N target images, and generating multiple three-dimensional images corresponding to a specific domain through certain noise data and a preset camera pose parameter by training a three-dimensional generation model, which is previously built, by using the selected target image.

In addition, the N source images and the N target images are three-dimensional images each composed of multiple camera viewpoints, and each of the N target images is converted to an image of at least one style set in the second domain while maintaining an object included in each of the N source images.

The three-dimensional image generation method includes, before the generating of the N target images, generating the N source images by inputting the certain noise data including an identifier of the first domain and the preset camera pose parameter to the three-dimensional generation model before the training.

The generating of the N target images includes generating the N target images by stochastically converting the N source images to match multiple styles indicated by the text through a text-to-image diffusion model, which is previously trained, by using data pairs of an image and a text.

The selecting of the only the target image includes filtering a target image of which difference from a style indicated by the text is greater than or equal to a preset threshold among the N target images.

The selecting of the only the target image includes filtering a target image of which a camera viewpoint difference from a corresponding source image is greater than or equal to a preset threshold among the N target images.

The generating of the multiple three-dimensional images includes outputting a new three-dimensional image by inputting the certain noise data including an identifier of the first domain and the camera pose parameter to the three-dimensional generation model, and performing fine tuning of the output three-dimensional image such that an adversarial loss according to a difference between the output three-dimensional image and a target image of the specific domain is reduced.

The generating of the multiple three-dimensional images includes performing fine tuning of the three-dimensional image output from the three-dimensional generation model through the certain noise data to correspond to the selected target image by selecting at least one of multiple styles set for the specific domain.

The generating of the multiple three-dimensional images includes generating the multiple three-dimensional images by implementing a three-dimensional embedding space corresponding to the specific domain by mapping previously collected actual two-dimensional images to the three-dimensional embedding space and inputting the mapped two-dimensional images to the three-dimensional generation model.

According to another aspect of the present disclosure, a three-dimensional image generation server includes a memory storing a program for performing a domain adaptable three-dimensional image generation method, and a processor configured to execute the program, wherein the processor includes a target image generation unit configured to generate N target images corresponding to a second domain by converting styles of previously collected N source images corresponding to a first domain according to instructions of an input text, a target image filtering unit configured to select only a target image that satisfies a preset condition among the N target images, and a domain adaptation unit configured to generating multiple three-dimensional images corresponding to a specific domain through certain noise data and a preset camera pose parameter by training a three-dimensional generation model, which is previously built, by using the selected target image.

The processor generates the N source images by inputting the certain noise data including an identifier of the first domain and the preset camera pose parameter to the three-dimensional generation model before training by the domain adaptation unit.

The target image generation unit generates the N target images by stochastically converting the N source images to match multiple styles indicated by the text through a text-to-image diffusion model, which is previously trained, by using data pairs of an image and a text.

The target image filtering unit filters a target image of which difference from a style indicated by the text is greater than or equal to a preset threshold among the N target images.

The target image filtering unit filters a target image of which a camera viewpoint difference from a corresponding source image is greater than or equal to a preset threshold among the N target images.

The domain adaptation unit outputs a new three-dimensional image by inputting the certain noise data including an identifier of the first domain and the camera pose parameter to the three-dimensional generation model, and performs fine tuning of the output three-dimensional image such that an adversarial loss according to a difference between the output three-dimensional image and a target image of the specific domain is reduced.

The domain adaptation unit performs fine tuning of the three-dimensional image output from the three-dimensional generation model through the certain noise data to correspond to the selected target image by selecting at least one of multiple styles set for the specific domain.

The domain adaptation unit generates the multiple three-dimensional images by implementing a three-dimensional embedding space corresponding to the specific domain by mapping previously collected actual two-dimensional images to the three-dimensional embedding space and inputting the mapped two-dimensional images to the three-dimensional generation model.

BRIEF DESCRIPTION OF THE DRAWINGS

Embodiments of the inventive concept will be more clearly understood from the following detailed description taken in conjunction with the accompanying drawings in which:

FIGS. 6 and 7 are conceptual example diagrams illustrating a target image filter according to an embodiment of the present disclosure;

FIGS. 12 and 13 are experimental data illustrating an effect of an embodiment of the present disclosure.

DETAILED DESCRIPTION OF THE EMBODIMENTS

Figure 1:
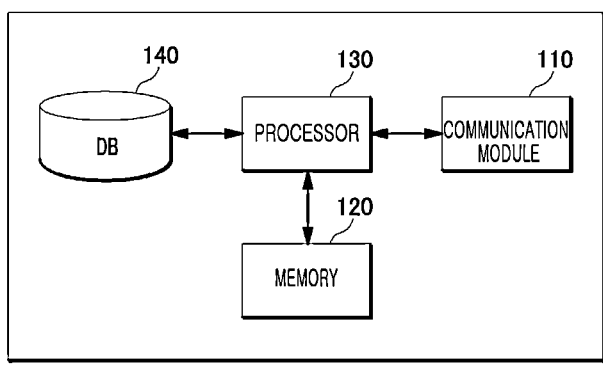
FIG. 1 is a block diagram illustrating a configuration of a three dimension (3D) image generation server according to an embodiment of the present disclosure.

Hereinafter, embodiments of the present disclosure will be described in detail with reference to the accompanying drawings such that those skilled in the art in which the present disclosure belongs may easily practice the present disclosure. However, the present disclosure may be implemented in many different forms and is not limited to the embodiments described herein. In addition, in order to clearly describe the present disclosure, parts irrelevant to the description are omitted in the drawings, and similar reference numerals are attached to similar parts throughout the specification.

When it is described that a portion is "connected" to another portion throughout the specification, this includes not only a case where the portion is "directly connected" to another portion but also a case where the portion is "electrically connected" to another portion with another component therebetween. In addition, when it is described that a portion "includes" a certain component, this means that the portion may further include another component without excluding another component unless otherwise stated.

In the present disclosure, a "portion" includes a unit realized by hardware, a unit realized by software, and a unit realized by using both. In addition, one unit may be realized by using two or more pieces of hardware, and two or more units may be realized by using one piece of hardware. Meanwhile, a "~ portion" is not limited to software or hardware, and a "~ portion" may be configured to be included in an addressable storage medium or may be configured to reproduce one or more processors. Therefore, in one example, "~ portion" refers to components, such as software components, object-oriented software components, class components, and task components, and includes processes, functions, properties, and procedures, subroutines, segments of program code, drivers, firmware, microcode, circuits, data, databases, data structures, tables, arrays, and variables. The functions provided within the components and "portions" may be combined into a smaller number of components and "portions" or may be further separated into additional components and "portions". Additionally, components and "portions" may be implemented to regenerate one or more central processing units (CPUs) within a device or a secure multimedia card.

In the present disclosure, "3D image" means an image rendered with multiple camera viewpoints rather than a single viewpoint.

In the present disclosure, "domain" refers to a class classified in advance according to the type of an object displayed in an image or characteristics displaying the object, and images having at least one common style may be clustered, and the criteria for distinguishing domains are not limited in particular. For example, according to the preset criteria, an image representing a human face and an image representing the face of a certain animal may be classified into different domains.

In the present disclosure, a "style" may mean a general term for the characteristics of an image that may represent one domain. At least one style may be set in one domain. In other words, one domain does not always include one style and may be composed of images of multiple styles related to each other according to a pre-learned result. For example, when a domain is "Disney", various characters included in Disney may constitute one style, and even when one character is represented differently depending on scenes, characters may be classified into different styles. In this way, the style of one domain may also be set as an upper or lower level concept. For example, a domain of "dog" may be further divided into a "dog style", a "poodle style", a "dachshund style", and a "schnauzer style".

In the present disclosure, "adaptation" is a term used for "domain adaptation", which is a known technology for converting an image into a style of another domain while maintaining an object and the content. A "source image" is a term commonly adopted in domain adaptation and refers to a three dimensional (3D) image of the "first domain" collected or generated as an image conversion target. A "target image" is also a common term in the field and refers to a 3D image of the "second domain" obtained by converting a source image through domain adaptation. In other words, the "second domain" is defined to be distinguished from the "first domain", and refers to all or part of a domain that is set differently from the "first domain" rather than only one domain.

Hereinafter, embodiment of the present disclosure will be described in detail with reference to the attached drawings.

FIG. 1 is a block diagram illustrating a configuration of a 3D image generation server according to an embodiment of the present disclosure. Here, a "server" is not simply limited to a term, but should be interpreted as any "device" that performs a 3D image generation method according to an embodiment of the present disclosure.

Referring to FIG. 1, a server 100 may include a memory 120 storing a program for performing a 3D image generation method capable of perform domain adaptation and a processor 130 that executes the program.

Also, the server 100 may include a database 140 storing various types of data generated while performing the 3D image generation method. For example, source images may be classified and stored according to preset domains, and target images converted from the source images may also be classified and stored according to domains. Also, a 3D image newly generated according to domain adaptation after training a 3D generation model is matched to a corresponding domain and stored.

Also, the server 100 may include a communication module 110 that performs data communication with a user terminal (not illustrated). For example, the server 100 may provide a user interface for a 3D image generation service to a user terminal, and a user may request the server 100 to generate a 3D image corresponding to various domains or a certain domain by using the user interface and receive a result thereof.

Here, the "user terminal" may refer to a computer or portable terminal that may be connected to a server or another terminal through a network. Here, the computer may include, for example, a notebook computer including a web browser, a desktop computer including the web browser, a laptop computer including a web browser, a virtual reality (VR) head mounted display (HMD) (for example, HTC VIVE, Oculus Rift, GearVR, DayDream, PSVR, or so on), or so on. Here, the VR HMD includes a VR HMD for a personal computer (PC) (for example, HTC VIVE, Oculus Rift, FOVE, Deepon, or so on), a mobile VR HMD (for example, GearVR, DayDream, Storm Magic, Google Cardboard, or so on), a stand-alone model (for example, Deepon, PICO, or so on) implemented independently from a console (PSVR), and so on. A mobile terminal is, for example, a wireless communication device with portability and mobility, which includes not only a smart phone, a tablet PC, and a wearable device but also various devices equipped with communication modules, such as Bluetooth (Bluetooth low energy: BLE), a near field communication (NFC) device, a radio frequency identification (RFID) device, an ultrasonic device, an infrared device, WiFi, and LiFi. Also, the "network" refers to a connection structure that allows information exchange between nodes such as terminals or servers, which includes a local area network (LAN), a wide area network (WAN), and the Internet. (WWW: World Wide Web), a wired and wireless data communication network, a telephone network, a wired and wireless television communication network, and so on. For example, the wireless data communication network includes third generation (3G), fourth generation (4G), fifth generation (5G), a 3rd generation partnership project (3GPP), long term evolution (LTE), world interoperability for microwave access (WIMAX), Wi-Fi, Bluetooth communication, infrared communication, ultrasonic communication, visible light communication (VLC), LiFi, and so on but is not limited thereto.

Figure 2:
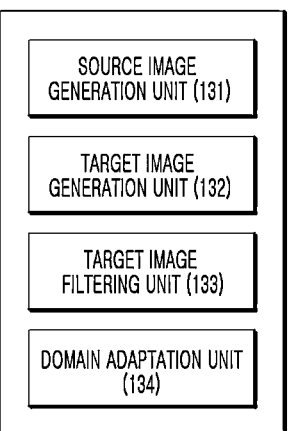
FIG. 2 is a block diagram illustrating a configuration of a processor according to an embodiment of the present disclosure.

In addition, the processor 130 may perform various functions according to execution of a program stored in the memory 120, and may further define in detail the components included in the processor 130 depending on respective functions. FIG. 2 is a block diagram illustrating a configuration of a processor according to an embodiment of the present disclosure.

Referring to FIG. 2, the processor 130 may include a target image generation unit 132, a target image filtering unit 133, and a domain adaptation unit 134. According to one embodiment, the processor 130 may further include a source image generation unit 131.

The source image generation unit 131 according to one embodiment serves to generate a 3D source image by using the previously constructed 3D generation model. In other words, since it is often realistically difficult to generate massive 3D images in advance, it is possible to easily generate 3D images of various styles corresponding to the first domain composed of a preset camera viewpoint by using a 3D generation model.

Figure 3:
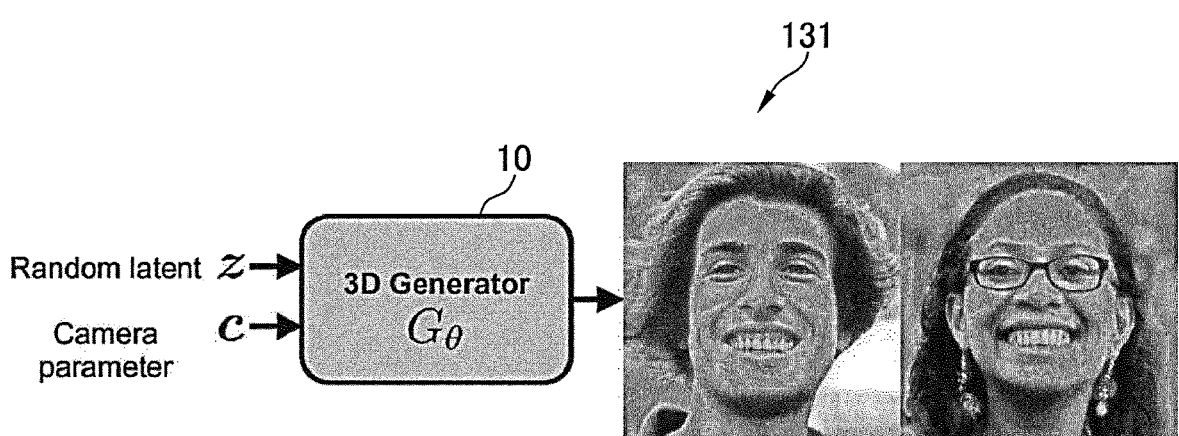
FIG. 3 is a conceptual diagram illustrating a source image generation unit according to an embodiment of the present disclosure.

Referring to FIG. 3, the source image generation unit 131 according to one embodiment may input certain noise data (random latent) and a preset camera pose parameter (camera parameter) to a 3D generation model (or 3D generator) 10 to generate N source images. For example, the source image generation unit 131 may extract many pieces of noise data by sampling random points based on Gaussian distribution and vectorizing the random points to a preset scale. The extracted noise data may include an identifier of the first domain, which represents an image corresponding to the first domain. Also, the camera pose parameter is distribution information of a camera pose set to correspond to each of multiple camera viewpoints, and may adjust directionality of the generated source image.

According to one embodiment, a design type or a training model of the 3D generation model 10 is not limited in particular, but may be a model that combines a two-dimensional (2D) convolutional neural network (CNN)-based generator with neural rendering. In particular, it is preferable that the 3D generation model 10 is designed as a StyleGAN2 generator incorporating a 3D induced bias from neural radiance field (NeRF). Accordingly, the 3D generation model 10 may sample infinite source images in real time through training using a single viewpoint image. Also, the 3D generation model 10 may generate source images with up-to-date quality, multi-view consistency, and detailed 3D shapes by utilizing a three-sided hybrid expression and performing conditioned double discrimination.

In addition, the 3D generation model 10 operating in this case is built to generate only source images, and is in a state of being not learned in relation to domain adaptation. For the sake of description, in some cases, the 3D generation model 10 in a source image generation step may be referred to as a "previous 3D generation model" to be distinguished from the "3D generation model" updated by training later domain adaptation.

The target image generation unit 132 according to one embodiment converts styles of N source images corresponding to the first domain according to instructions of the previously input text to generate N target images corresponding to the second domain. In other words, a process of converting the style of a source image for each camera viewpoint to fit the second domain according to the content of a text corresponding to the second domain and generating a target image for each camera viewpoint may be repeated N times.

According to one embodiment, the target image generation unit 132 converts the source image into a style indicated by the text by using a text-guided domain adaptation model previously trained through many pieces of training data of image-text pairs, and accordingly, the first domain and the second domain are converted into each other. For example, when the first domain is a "human face" and the second domain to be converted is "Disney", a source image including a certain human face and a text indicating "style of Disney" are input, and accordingly, a target image obtained by converting the human face of the source image into Disney characters may be output.

In this case, the type of text-guided domain adaptation model is not limited thereto, and styleGAN-NADA may be used as an example. The styleGAN-NADA is designed based on a space defined by CLIP which is composed of an image encoder and a text encoder and converts an input into a vector. The styleGAN-NADA causes a CLIP space direction between a source image and a target image to be aligned with a direction between the source image and a text. In other words, the styleGAN-NADA may move the first domain to the second domain through a text guided by CLIP loss based on the pre-trained StyleGAN2 generator.

Another example is HyperDomainNet, which is also CLIP-based and additionally introduces domain modulation technology to reduce the number of learning parameters and the consistency loss of angles within the domain. However, the models have a disadvantage of not being able to reflect various styles inherent in the content indicated by the text. In other words, due to the deterministic embedding of the CLIP encoder, there is a limit to diversity in that an image representing only one or similar styles within the domain may be generated. For example, there are various characters and styles in the "Disney", but it is checked that there is a relatively high possibility of being implemented as a target image expressed only by specific characters in the CLIP-based model.

Figure 4:
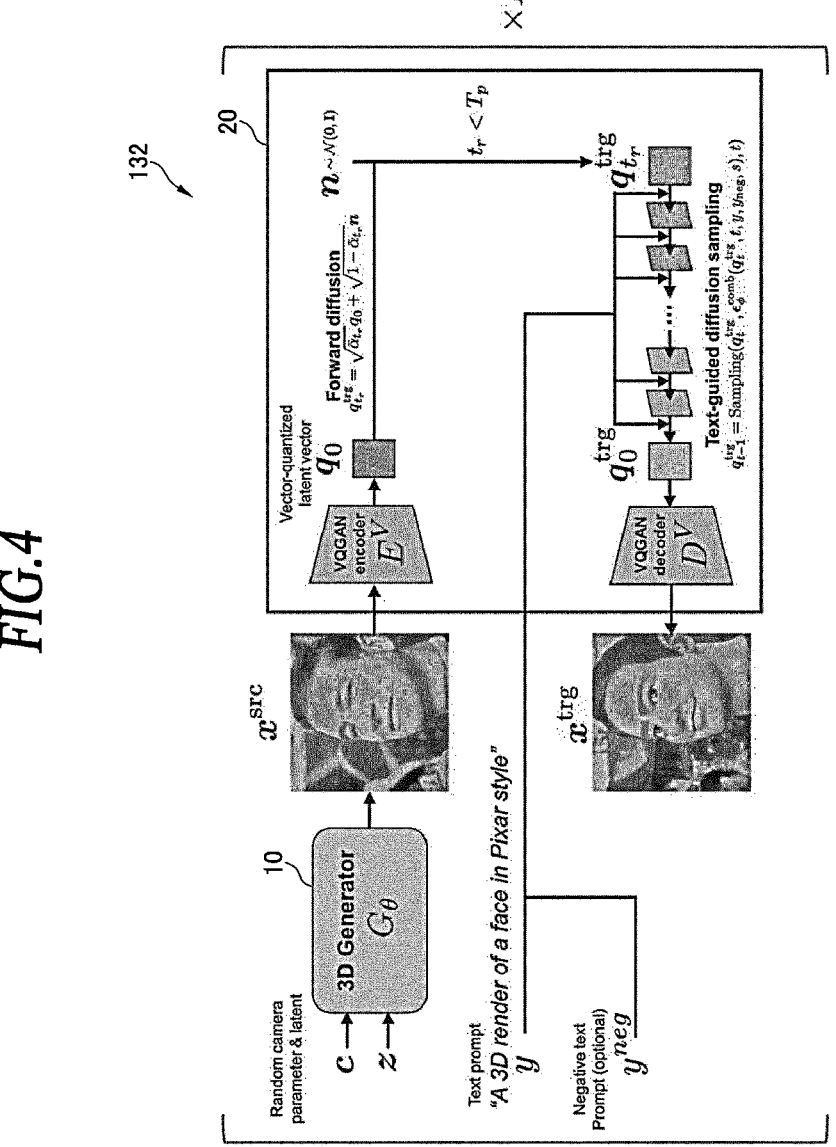
FIG. 4 is a conceptual diagram illustrating a target image generation unit according to an embodiment of the present disclosure.

In relation to this, referring to FIG. 4, the target image generation unit 132 according to one embodiment may generate a target image of the second domain through a text-to-image diffusion model 20. The text-to-image diffusion (T2I) model is also trained by using many image-to-text data pairs, but unlike CLIP, the text-to-image diffusion model is designed as a stochastic generation process rather than deterministic embedding. Accordingly, the text-to-image diffusion model 20 has an advantage of being highly likely to preserve the diversity of styles inherent in the text. That is, the text-to-image diffusion model 20 may generate a target image implemented in at least one style, preferably multiple styles, set in the second domain.

Referring to FIG. 4, in one embodiment of an operation of the text-to-image diffusion model 20, when a source image is first input to a VQGAN-based encoder, the source image is vectorized and encoded as a vector $q_0$. Thereafter, $q_0$ is disturbed through a stochastic forward denoising diffusion probabilistic model (DDPM) process by using a noise schedule parameter $$\{\overline{\alpha}_t\}_{t=1}^T$$

until $tr < Tp$. Here, T is the total number of diffusion steps used for training, and $T_p$ is a consistency step of a camera viewpoint which is the last diffusion step when the camera pose parameters (pose information) is preserved. Therethrough, a vector $$q_{t_r}^{trg}$$

according to Equation 1 below is obtained.

$$q_{t_r}^{trg} = \sqrt{\overline{\alpha}_{t_r}}\, q_0 + \sqrt{1 - \overline{\alpha}_{t_r}}\, n, \text{ where } n \sim \mathcal{N}(0, I). \qquad \text{Equation 1}$$

Thereafter, a target vector $$q_0^{trg}$$

is generated through a text-induced sampling process represented by Equation 2 below.

$$q_{t-1}^{trg} = \text{Sampling}\big(q_t^{trg}, \epsilon_\phi^{comb}\big(q_t^{trg}, t, y, y_{neg}, s\big), t\big) \qquad \text{Equation 2}$$

Here, y is a text corresponding to the second domain, and $y_{neg}$ is a selectable option item as a negative text input to prevent the target image from being contaminated due to an unintended style. s is a scale guide parameter for controlling scales of y and $y_{neg}$, and a combination function may be defined by Equation 3 below.

$$\epsilon_\phi^{comb} = s\epsilon_\phi\big(q_t^{trg}, t, y\big) + (1-s)\epsilon_\phi\big(q_t^{trg}, t, y_{neg}\big). \qquad \text{Equation 3}$$

Also, a sampling method here may be a DDPM process, but DDIM and PLMS may also be adopted, and the present disclosure is not limited thereto.

Target images of various styles within the second domain inherent in a text are output by a VQGAN-based decoder based on the target vector obtained in this way. The target image generation unit 132 may repeat this process to collect a training data set consisting of noise data, a source image, and a target image for adaptation to various domains different from the first domain.

In addition, in the process of generating a target image, there may be a tendency to learn only a specific style or a similar style among several styles set in the second domain. In particular, when the style set in the second domain and a corresponding text include upper-level and lower-level concepts, learning may be focused only on specific lower-level styles. For example, when the second domain is a "dog", the text is input like "3D rendering in a dog style", and in this case, a target image obtained by being intensively trained only for a specific breed of dog (for example, poodle) may also be represented mainly in the poodle style.

Figure 5:
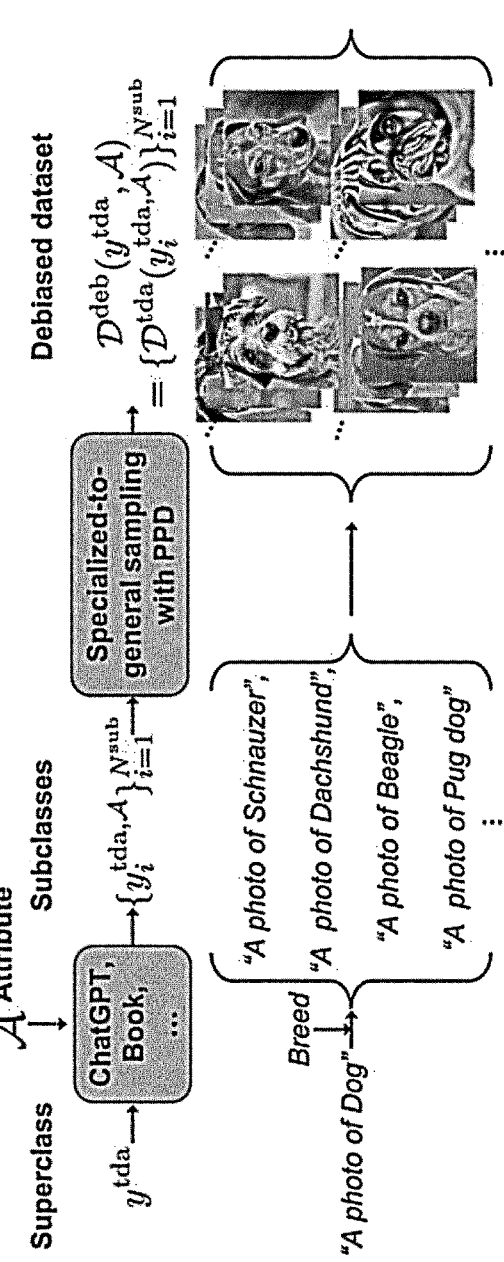
FIG. 5 is a conceptual example diagram illustrating an operation of a target image generation unit according to an embodiment of the present disclosure.

In this regard, the target image generation unit 132 according to one embodiment may divide the text into subtexts corresponding to each substyle and input the subtexts into the text-to-image diffusion model 20. Therethrough, a target image with diversity implemented in multiple substyles may be generated. For example, referring to FIG. 5, the second domain is a "dog", which may be further subdivided into several styles. Accordingly, a text being representing a dog through a preset deep learning program or data search may be further subdivided into subtexts including several species, such as schnauzer and dachshund, and as a result, it can be seen that a target image represented as a various species rather than a specific species (style) is generated.

In the embodiment described above, the target image with diversity is described by using the text-to-image diffusion model 20, which is a technique based on probability theory, and due to characteristics thereof, a target image with low accuracy or value as training data for domain adaptation may be generated.

In order to solve the problem, the target image filtering unit 133 according to one embodiment performs a filtering operation to select only a target image that satisfy a preset condition among the target images generated by the target image generation unit 132.

First, referring to FIG. 6A, a target image with poor consistency with a style indicated by a text may be generated. In this regard, the target image filtering unit 133 may perform a process of filtering a target image not matched to an instruction of a text.

According to one embodiment, the target image filtering unit 133 may filter a target image of which difference in style indicated by the text is greater than or equal to a preset threshold among the generated target images. For example, referring to FIG. 6B, each target image and text are input to separate encoders and sent to one vector space to convert each of the target image and text into a vector, and the similarity therebetween is measured. Here, the similarity may be represented as a difference of the sum of an inner product on both vectors, which may be defined as a cosine distance d in the vector space. The target image filtering unit 133 may calculate a distance d for each target image and remove a target image of which calculated distance is greater than or equal to a preset threshold. In addition, the vector space is not limited in particular, but a CLIP space is preferable, and in this case, the filtering process according to the present embodiment may be represented by Equation 4 below.

$$d_{CLIP}(x^{trg}, y) = 1 - \frac{\langle E_I^C(x^{trg}), E_T^C(y)\rangle}{\big\| E_I^C(x^{trg})\big\|\big\| E_T^C(y)\big\|} > \alpha \qquad \text{Equation 4}$$

Figure 7:
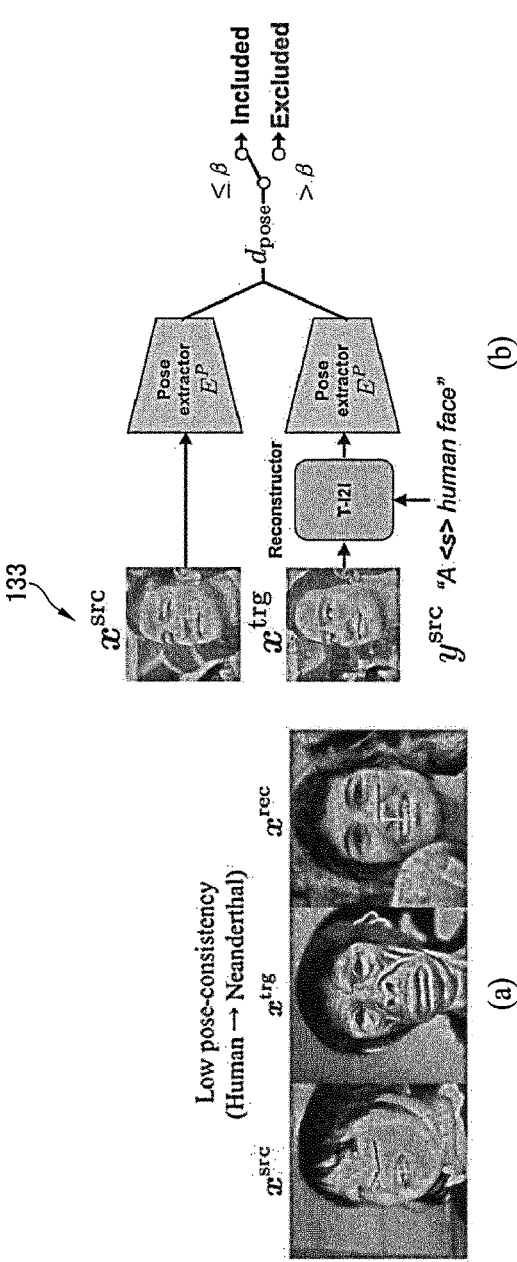

Next, referring to FIG. 7A, there is a difference in pose between a target image and a source image constituting one piece of training data, that is, a case in which a target image different from a camera viewpoint of the source image is generated may occur. In order to prevent this, the target image filtering unit 133 may filter a target image of which pose distribution is different from a pose distribution of the source image among the generated target images.

According to one embodiment, the target image filtering unit 133 may filter a target image, which has a difference in camera viewpoint greater than or equal to a preset threshold compared to a corresponding source image, among the generated target images. For example, referring to FIG. 7B, the target image filtering unit 133 may use a previously trained pose extractor $E^P$. Pose information of a source image x and pose information of a target image x' may be predicted by the pose extractor, and when a score indicating a difference between respective pieces of pose information is greater than or equal to a threshold, a corresponding target image may be removed. In this case, a process of reconstructing the target image to the first domain may be performed to obtain the score. That is, in reality, a difference in pose between the target image converted back to the first domain and the source image may be calculated as a score. In addition, a score d may be represented by Equation 5 below.

$$d_{pose}(x, x') = \big\| E^P(x) - E^P(x')\big\|_2^2. \qquad \text{Equation 5}$$

The domain adaptation unit 134 according to one embodiment performs training the 3D generation model 10 for domain adaptation by using a target image selected by the target image filtering unit 133. More precisely, the 3D generation model 10 that performs non-adversarial fine-tuning or adversarial fine-tuning by using training data including noise data, a source image, and a target image.

Specifically, the non-adversarial fine-tuning uses CLIP-based loss, such as StyleGAN-NADA and HyperDomain-Net. As described above, there is a risk that 3D images lacking diversity and of somewhat poor quality may be generated due to deterministic embedding, and accordingly, it is preferable to preserve diversity by utilizing an adversarial neural network-based loss. In this case, the type of adversarial neural network is not limited and may include, for example, StyleGAN-ADA.

Figure 8:
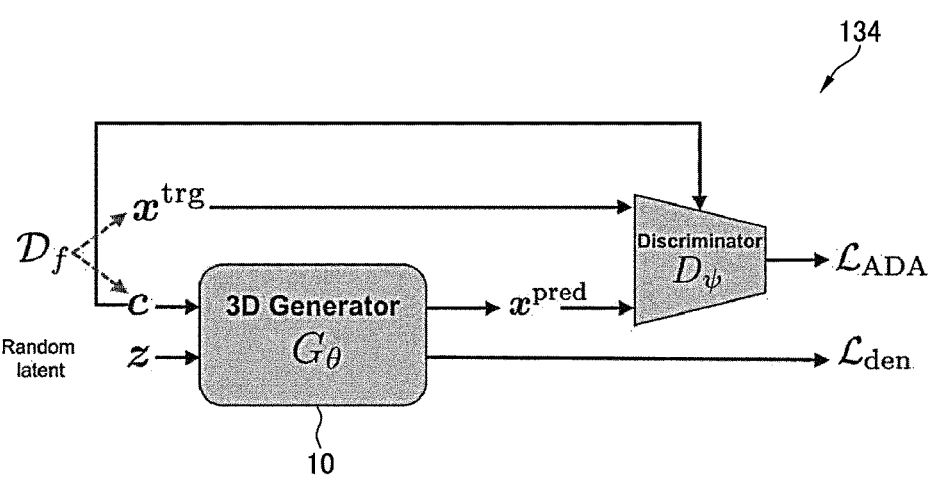
FIG. 8 is a conceptual diagram illustrating a domain adaptation unit according to an embodiment of the present disclosure.

Referring to FIG. 8, the domain adaptation unit 134 according to one embodiment may input certain noise data and camera pose parameters including an identifier of the first domain to the 3D generation model 10 and output a new 3D image $x^{pred}$ of the first domain. Thereafter, a 3D image is converted to a specific domain, and in this case, adversarial loss $L_{ADA}$ and density regularization loss $L_{den}$ may be used in discrimination training.

First, the adversarial loss $L_{ADA}$ is a loss that determines the 3D image $x_{pred}$ output by a 3D generation model and a target image of a specific domain and corresponds to similarity (a difference) therebetween. Accordingly, the domain adaptation unit 134 trains the 3D generation model 10 such that the adversarial loss is reduced, and through this, fine tuning for converting the newly output 3D image $x^{pred}$ to the style of a desired domain is performed. In addition, the adversarial loss may be calculated by Equation 6 below. Here, a function f means $f(u) = \text{log}\,(1+\exp(\,u))$.

$$\mathcal{L}_{ADA}^{\theta,\psi} = \mathbb{E}_{z\sim\mathcal{Z},c\sim C}[f(D_\psi(A(G_\theta(z,\,c)),\,c)] + \atop \mathbb{E}_{(c,x^{trg})\in\mathcal{D}_f}\left[f\left(-D_\psi(A(x^{trg}),\,c) + \lambda\|\nabla D_\psi(A(x^{trg}),\,c)\|^2\right)\right] \qquad \text{Equation 6}$$

The density regulation loss $L_{den}$ is a loss corresponding to smoothness of the density for reducing a phenomenon of unintentional distortion of a newly generated 3D image of a specific domain into a different shape. Specifically, the domain adaption unit 134 randomly selects a random point v from a volume V of each scene constituting the 3D image and additionally selects a disturbance point distorted by Gaussian noise $\delta v$. Thereafter, a loss L between the predicted densities is calculated by Equation 7 below, and a 3D generation model is trained to reduce the loss L.

$$\mathcal{L}_{den}^{\theta} = \mathbb{E}_{v\in V}[\|\sigma_\theta(v) - \sigma_\theta(v+\delta v)\|]. \qquad \text{Equation 7}$$

Through this process, the domain adaptation unit 134 may generate a new 3D image of the first domain by using the trained 3D generation model 10 and then perform conversion into various domains, through which an infinite number of 3D images of various styles for each domain may be generated. For example, when the first domain is a "human face" and a user requests a 3D image converted to a "Disney" style, the server 100 may generate 3D images of various styles implemented with various Disney characters through domain adaptation for the 3D images including a human face and provide the 3D images to a user terminal.

In addition, for example, when a user only wants a specific character in a "Disney" domain, a situation may arise in which a 3D image of a specific style is required. In this regard, the domain adaptation unit 134 may generate a 3D image implemented in only one (or similar) style among multiple styles set for a specific domain as an example of maximizing the characteristics of diversity.

Figure 9:
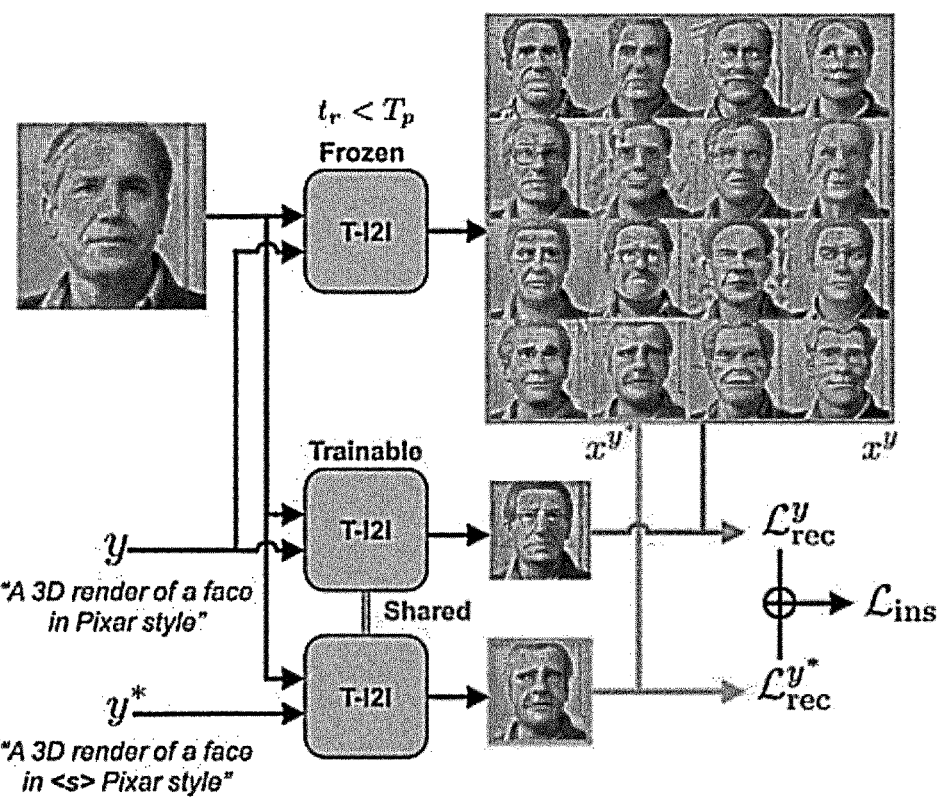
FIG. 9 is a conceptual example diagram illustrating style selection domain adaptation according to an embodiment of the present disclosure.

Referring to FIG. 9, for example, when the second domain is "Pixar", a target image composed of various styles of Pixar may be obtained through a text-to-image diffusion model. In this case, a user may select one desired style <s> and perform fine tuning of the text-to-image diffusion model according to the style <s>. In this case, the text-to-image diffusion model may be adjusted with only image of a corresponding style <s> by limiting a diffusion step from zero to a pose consistency step $T_P$ by using a loss $L_{ins}$ that may be defined by Equation 8 below. Here, y is a text representing Pixar, $x^y$ is a target image generated by using y, $y^*$ is a text including an additionally specified style <s>, and $x^{y^*}$ is a target image generated to the style <s> by using $y^*$.

$$\mathbb{E}_{\epsilon\sim\mathcal{N}(0,1),t\in[0,T_p]}\left[\left\|\epsilon - \epsilon_\phi\!\left(E^V\!\left(x^{y^*}\right),\,t,\,y^*\right)\right\|_2^2\right] + \atop \mathbb{E}_{z\in\{E^V(x_i^y)\}_{i=1}^{N_d},\epsilon\sim\mathcal{N}(0,1),t\in[0,T_p]}\left[\|\epsilon - \epsilon_\phi(z_t,\,t,\,y))\|_2^2\right] \qquad \text{Equation 8}$$

Thereafter, the server 100 may replace the text-to-image diffusion model 20 with a text-to-image diffusion model adjusted as described above, and accordingly, the domain adaptation unit 134 may generate multiple 3D images represented by <s> in the Pixar style by performing fine tuning of the newly output 3D image to correspond to the selected style <s>.

Figure 10:
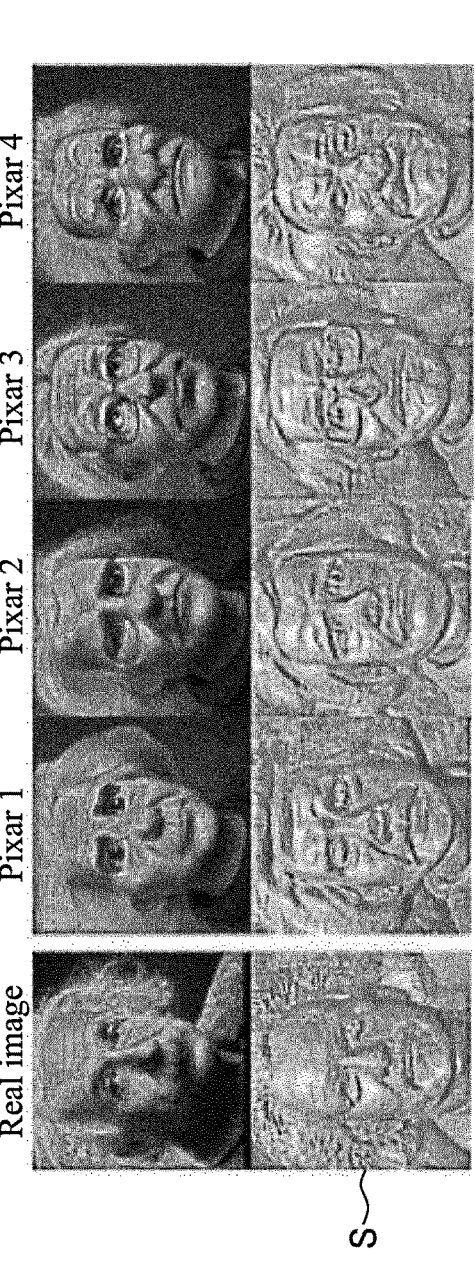
FIG. 10 is an example diagram illustrating domain adaptation of a 3D image through a two-dimensional image, according to an embodiment of the present disclosure.

According to one embodiment, the domain adaptation unit 134 may generate 3D images implemented in various styles of multiple domains even through the previously collected actual 2D images. Referring to FIG. 10, an actual image may be mapped to a 3D embedding space S by using a technique, such as GAN inversion. Thereafter, by inputting an actual image into the 3D generation model 10, a 3D embedding space of a specific domain may be obtained, and based thereon, a 3D image implemented in various styles of a corresponding domain may be generated. As such, the present embodiment provides a function of generating a 3D image of a desired domain and style even by using an image of a single viewpoint.

Figure 11:
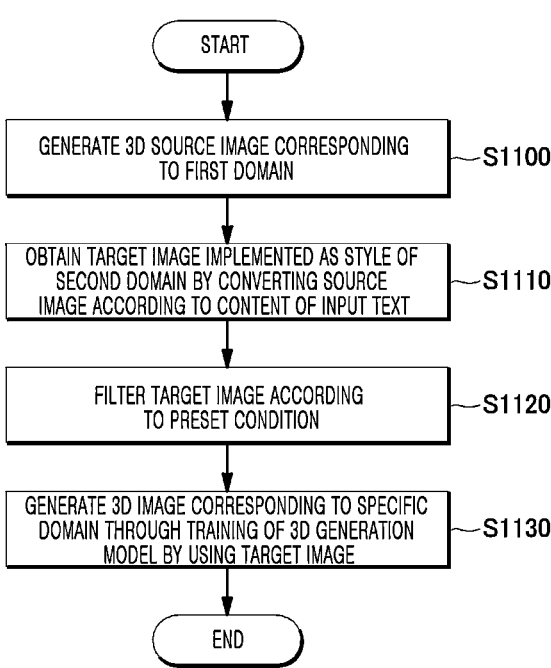
FIG. 11 is a flowchart of a 3D image generation method according to an embodiment of the present disclosure.

Hereinafter, a process of a 3D image generation method performed by the server 100 is described with reference to FIG. 11. FIG. 11 is a flowchart of a 3D image generation method according to an embodiment of the present disclosure, which corresponds to an operation of the server 100, and accordingly, detailed descriptions thereof are replaced with the above descriptions.

In step S1100, the server 100 generates N source images by inputting certain noise data including an identifier of the first domain and a preset camera pose parameter to a previous 3D generation model.

In step S1110, the server 100 generates N target images corresponding to the second domain by converting the style of a source image according to instructions of an input text.

In one embodiment, the server 100 generates a target image by stochastically converting the source image to be matched to multiple styles indicated by the text through a text-to-image diffusion model previously trained by data pairs of image and text. Accordingly, the diversity of image styles may be preserved.

In one embodiment, when the style set in the second domain includes multiple substyles, the server 100 further divides the text into subtexts respectively corresponding to the multiple substyles and inputs the multiple substyles, thereby generating various target images implemented by the multiple substyles.

In step S1120, the server 100 selects only a target image that satisfies a preset condition among the generated target images.

In one embodiment, the server 100 filters a target image of which difference in style indicated by the text is greater than or equal to a preset threshold among the generated target images. In other words, only a target image with a high degree of consistency with the text is used for training to increase the accuracy of domain adaptation and image quality.

In one embodiment, the server 100 filters a target image of which a difference in camera viewpoint from the corresponding source image is greater than or equal to a preset threshold among the generated target images. That is, by excluding the target image having a different pose distribution from the source image from training, the accuracy of domain adaptation and the image quality are increased.

In step S1130, the server 100 trains a 3D generation model by using the selected target image, thereby generating multiple 3D images corresponding to a specific domain through certain noise data and camera pose parameters. That is, by generating a new 3D image of the first domain and then converting the new 3D image into a desired domain, 3D images of various styles may be obtained without a separate image collection process.

In one embodiment, the server 100 outputs a new 3D image by inputting certain noise data and camera pose parameters including an identifier of the first domain to a 3D generation model, and performs fine tuning of the output 3D image such that an adversarial loss due to a difference between the output 3D image and a target image of a corresponding domain is reduced.

In one embodiment, the server 100 selects at least one of multiple styles set in a specific domain, thereby, performing fine tuning such that the 3D image output from the 3D generation model through certain noise data correspond to a target image of the style selected above. That is, it is possible to selectively obtain a 3D image implemented in only the desired style within a specific domain, and thus, an effect of maximizing diversity is obtained.

In one embodiment, the server 100 maps a previously collected actual 2D image to a 3D embedding space and inputs the mapped 2D image to a 3D generation model, thereby implementing a 3D embedding space corresponding to the specific domain to generate 3D images of various styles within the domain. That is, it is possible to obtain a 3D image of a desired domain with only an image of a single viewpoint.

Hereinafter, experimental data and supporting effects according to the embodiment of the present disclosure are described with reference to FIGS. 12 and 13. In addition, although FIG. 12 illustrates 2D images, this is due to limitations in a drawing format, and the illustrated 2D images are actually 3D images in the form of a video composed of multiple viewpoints.

First, domain adaptation of 3D images was performed by simply extending the CLIP-based styleGAN-NADA and HyperDomainNet described above. Also, in contrast to this, according to the present disclosure, the domain adaptation was performed by using a 3D generation model trained based on the text-to-image diffusion. The first domain was human, and a source image representing a human face was used, and converted domains were set to elf and zombie.

Figure 12:
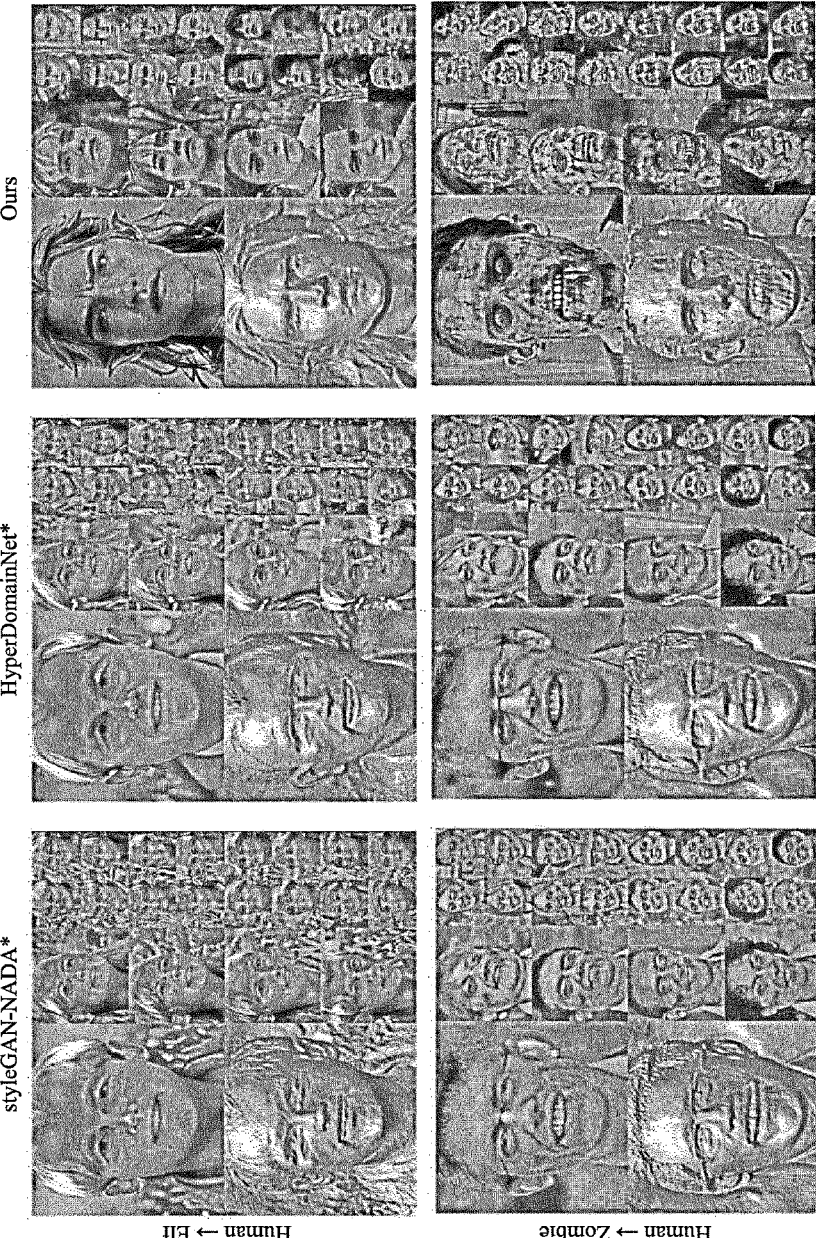

FIG. 12 illustrates 3D images generated based on CLIP and 3D images generated according to the present disclosure. Comparing these, when used styleGAN-NADA and HyperDomainNet, somewhat ambiguous images as to whether the images were persons or elves (or zombies) were output due to inconsistency with a text, and most of the images were implemented in a similar style, and accordingly, it could be seen that diversity was reduced. On the other hand, according to the present disclosure, realistic and detailed high-quality images were obtained compared to the images described above because the consistency with the text increased, and the respective images were implemented in different styles, and accordingly, it could be seen that there was a significant increase in diversity.

FIG. 13 is a table illustrating quantitative values according to users' quality evaluation of 3D images generated by styleGAN-NADA and HyperDomainNet, and the present disclosure. By checking the table, it can be seen that 3D images generated by the present disclosure show superior performance in all aspects of consistency with a text, realism, and diversity compared to 3D image generated by the known technology.

The embodiment of the present disclosure provides a 3D generation model that may generate virtual 3D images without separate image collection.

The embodiment of the present disclosure provides a 3D generation model that may generate 3D images of various domains.

The embodiment of the present disclosure provides a 3D generation model that may be adapted to domains having large gaps by converting the known 3D images according to the meaning of a text.

The embodiment of the present disclosure provides a 3D generation model that generates 3D images with guaranteed diversity rather than being limited to similar styles within a specific domain.

The embodiment of the present disclosure selects only images that satisfy text consistency and the original viewpoint and provides a 3D generation model with improved accuracy through training.

The embodiment of the present disclosure provides a 3D generation model that selects a specific style within a domain based on the diversity of a text and adapts the selected style to a domain.

The embodiment of the present disclosure provides a 3D generation model that may generate 3D images of various domains by using 2D images each composed of one viewpoint.

Although the method and system of the present disclosure are described with reference to specific embodiments, some or all of their components or operations may be implemented by using a computer system having a general-purpose hardware architecture.

The above description of the present disclosure is for illustrative purposes, and those skilled in the art to which the present disclosure belongs will understand that the present disclosure may be easily modified into another specific form without changing the technical idea or essential features of the present disclosure. Therefore, the embodiments described above should be understood as illustrative in all respects and not limiting. For example, each component described as a single type may be implemented in a distributed manner, and likewise, components described as distributed may be implemented in a combined form.

The scope of the present disclosure is indicated by the following claims rather than the detailed description above, and the meaning and scope of the claims and all changes or modifications derived from the equivalent concepts should be interpreted as being included in the scope of the present disclosure.

What is claimed is:

1. A three-dimensional image generation method that is performed by a server and is capable of domain adaptation, the three-dimensional image generation method comprising:

generating N target images corresponding to a second domain by converting styles of previously collected N source images corresponding to a first domain according to instructions of an input text;

selecting only a target image that satisfies a preset condition among the N target images; and generating multiple three-dimensional images corresponding to a specific domain through certain noise data and a preset camera pose parameter by training a three-dimensional generation model, which is previously built, by using the selected target image, wherein the N source images and the N target images are three-dimensional images each composed of multiple camera viewpoints, and each of the N target images is converted to an image of at least one style set in the second domain while maintaining an object included in each of the N source images.

2. The three-dimensional image generation method of claim 1, further comprising:

before the generating of the N target images, generating the N source images by inputting the certain noise data including an identifier of the first domain and the preset camera pose parameter to the three-dimensional generation model before the training.

3. The three-dimensional image generation method of claim 1, wherein the generating of the N target images includes generating the N target images by stochastically converting the N source images to match multiple styles indicated by the text through a text-to-image diffusion model, which is previously trained, by using data pairs of an image and a text.

4. The three-dimensional image generation method of claim 1, wherein the selecting of only the target image includes filtering a target image of which difference from a style indicated by the text is greater than or equal to a preset threshold among the N target images.

5. The three-dimensional image generation method of claim 1, wherein the selecting of only the target image includes filtering a target image of which a camera viewpoint difference from a corresponding source image is greater than or equal to a preset threshold among the N target images.

6. The three-dimensional image generation method of claim 1, wherein the generating of the multiple three-dimensional images includes:

outputting a new three-dimensional image by inputting the certain noise data including an identifier of the first domain and the camera pose parameter to the three-dimensional generation model; and performing fine tuning of the output three-dimensional image such that an adversarial loss according to a difference between the output three-dimensional image and a target image of the specific domain is reduced.

7. The three-dimensional image generation method of claim 1, wherein the generating of the multiple three-dimensional images includes performing fine tuning of the three-dimensional image output from the three-dimensional generation model through the certain noise data to correspond to the selected target image by selecting at least one of multiple styles set for the specific domain.

8. The three-dimensional image generation method of claim 1, wherein the generating of the multiple three-dimensional images includes generating the multiple three-dimensional images by implementing a three-dimensional embedding space corresponding to the specific domain by mapping previously collected actual two-dimensional images to the three-dimensional embedding space and inputting the mapped two-dimensional images to the three-dimensional generation model.

9. A three-dimensional image generation server comprising:

a memory storing a program for performing a domain adaptable three-dimensional image generation method; and a processor configured to execute the program, wherein the processor includes:

a target image generation unit configured to generate N target images corresponding to a second domain by converting styles of previously collected N source images corresponding to a first domain according to instructions of an input text, a target image filtering unit configured to select only a target image that satisfies a preset condition among the N target images, and a domain adaptation unit configured to generating multiple three-dimensional images corresponding to a specific domain through certain noise data and a preset camera pose parameter by training a three-dimensional generation model, which is previously built, by using the selected target image, and wherein the N source images and the N target images are three-dimensional images each composed of multiple camera viewpoints, and each of the N target images is converted to an image of at least one style set in the second domain while maintaining an object included in each of the N source images.

10. The three-dimensional image generation server of claim 9, wherein the processor generates the N source images by inputting the certain noise data including an identifier of the first domain and the preset camera pose parameter to the three-dimensional generation model before training by the domain adaptation unit.

11. The three-dimensional image generation server of claim 9, wherein the target image generation unit generates the N target images by stochastically converting the N source images to match multiple styles indicated by the text through a text-to-image diffusion model, which is previously trained, by using data pairs of an image and a text.

12. The three-dimensional image generation server of claim 9, wherein the target image filtering unit filters a target image of which difference from a style indicated by the text is greater than or equal to a preset threshold among the N target images.

13. The three-dimensional image generation server of claim 9, wherein the target image filtering unit filters a target image of which a camera viewpoint difference from a corresponding source image is greater than or equal to a preset threshold among the N target images.

14. The three-dimensional image generation server of claim 9, wherein the domain adaptation unit outputs a new three-dimensional image by inputting the certain noise data including an identifier of the first domain and the camera pose parameter to the three-dimensional generation model, and performs fine tuning of the output three-dimensional image such that an adversarial loss according to a difference between the output three-dimensional image and a target image of the specific domain is reduced.

15. The three-dimensional image generation server of claim 9, wherein the domain adaptation unit performs fine tuning of the three-dimensional image output from the three-dimensional generation model through the certain noise data to correspond to the selected target image by selecting at least one of multiple styles set for the specific domain.

16. The three-dimensional image generation server of claim 9, wherein the domain adaptation unit generates the multiple three-dimensional images by implementing a three-dimensional embedding space corresponding to the specific domain by mapping previously collected actual two-dimensional images to the three-dimensional embedding space and inputting the mapped two-dimensional images to the three-dimensional generation model.

* * * * *